US011388684B2

(12) United States Patent
Frank (10) Patent No.: US 11,388,684 B2
(45) Date of Patent: Jul. 12, 2022

(54) METHOD AND APPARATUS FOR MANAGING THE MAXIMUM POWER ON A SECONDARY CARRIER

(71) Applicant: Lenovo (Singapore) Pte. Ltd., New Tech Park (SG)

(72) Inventor: Colin Frank, Park Ridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 78 days.

(21) Appl. No.: 16/837,436

(22) Filed: Apr. 1, 2020

(65) Prior Publication Data

US 2020/0314771 A1  Oct. 1, 2020

Related U.S. Application Data

(60) Provisional application No. 62/827,760, filed on Apr. 1, 2019.

(51) Int. Cl.
*H04W 52/36* (2009.01)
*H04W 76/15* (2018.01)
(Continued)

(52) U.S. Cl.
CPC ..... *H04W 52/367* (2013.01); *H04W 72/0473* (2013.01); *H04W 76/15* (2018.02); *H04W 84/20* (2013.01)

(58) Field of Classification Search
CPC ............... H04W 52/367; H04W 76/15; H04W 72/0473; H04W 84/20; H04W 52/30;
(Continued)

(56) References Cited

U.S. PATENT DOCUMENTS

2015/0296464 A1* 10/2015 Sagae ................. H04W 52/367
455/522
2016/0270139 A1* 9/2016 Rahman .................. H04L 5/001
(Continued)

FOREIGN PATENT DOCUMENTS

EP  3142428 A1  3/2017

OTHER PUBLICATIONS

Qualcomm, "Configured output power for FR1 EN-DC operation" 3GPPTSG RAN WG4 Meeting #86, Athens, Greece, Feb. 26-Mar. 2, 2018, R4-1904676. (Year: 2018).*
(Continued)

*Primary Examiner* — Phirin Sam
*Assistant Examiner* — Louis Samara
(74) *Attorney, Agent, or Firm* — Loppnow & Chapa (57) ABSTRACT

A method and apparatus provides for determining an upper bound of a maximum power in the user equipment, which can configure the maximum power in a range that is defined by the upper bound and a lower bound. The method includes determining whether a configured output power for a master cell group in a dual connectivity mode of operation is less than a minimum of a maximum allowed power for a particular serving cell and a maximum allowed combined power. The upper bound of the maximum power in the user equipment is set equal to the minimum of (1) the minimum of the maximum allowed power for the particular serving cell and the maximum allowed combined power, less the configured output power for the master cell group, (2) a maximum allowed power for a secondary cell group, and (3) an adjusted maximum power of a power class of the user equipment, based upon a determination that the configured output power for the master cell group in a dual connectivity mode of operation is less than the minimum of the maximum allowed power for the particular serving cell and the maxi-
(Continued)

mum allowed combined power. The upper bound of the maximum power in the user equipment is set equal to zero power, based upon a determination that the configured output power for the master cell group in a dual connectivity mode of operation is not less than the minimum of the maximum allowed power for the particular serving cell and the maximum allowed combined power.

19 Claims, 4 Drawing Sheets

(51) Int. Cl.
  *H04W 72/04* (2009.01)
  *H04W 84/20* (2009.01)
(58) Field of Classification Search
  CPC . H04W 52/42; H04W 72/0406; H04W 52/34; H04W 52/16; H04W 72/1289
  See application file for complete search history.

(56) References Cited

U.S. PATENT DOCUMENTS

| | | | | |
|---|---|---|---|---|
| 2018/0160375 | A1* | 6/2018 | Takeda | H04W 72/04 |
| 2020/0022097 | A1* | 1/2020 | Wang | H04W 72/1289 |
| 2020/0374808 | A1* | 11/2020 | Zhang | H04W 52/367 |
| 2021/0204227 | A1* | 7/2021 | Bergljung | H04W 52/365 |
| 2021/0227475 | A1* | 7/2021 | Tang | H04W 52/16 |

OTHER PUBLICATIONS

3GPP TS 36.101 V15.6.0 (Mar. 2019), 3rd Generation Partnership Project; Technical Specification Group Radio Access Network; Evolved Universal Terrestrial Radio Access (E-UTRA); User Equipment (UE) radio transmission and reception (Release 15), 1815 pages.
3GPP TS 36.331 V15.5.0 (Mar. 2019), 3rd Generation Partnership Project; Technical Specification Group Radio Access Network; Evolved Universal Terrestrial Radio Access (E-UTRA); Radio Resource Control (RRC); Protocol specification (Release 15), 944 pages.
3GPP TS 38.101-1 V15.5.0 (Mar. 2019), 3rd Generation Partnership Project; Technical Specification Group Radio Access Network; NR; User Equipment (UE) radio transmission and reception; Part 1: Range 1 Standalone (Release 15), 232 pages.
3GPP TS 38.101-3 V15.5.0 (Mar. 2019), 3rd Generation Partnership Project; Technical Specification Group Radio Access Network; NR; User Equipment (UE) radio transmission and reception; Part 3: Range 1 and Range 2 Interworking operation with other radios (Release 15), 193 pages.
3GPP TS 38.213 V15.5.0 (Mar. 2019), 3rd Generation Partnership Project; Technical Specification Group Radio Access Network; NR; Physical layer procedures for control (Release 15), 104 pages.
3GPP TS 38.331 V15.5.0 (Mar. 2019), 3rd Generation Partnership Project; Technical Specification Group Radio Access Network; NR; Radio Resource Control (RRC) protocol specification (Release 15), 489 pages.
PCT International Search Report for PCT/IB2020/053112, Lenovo (Singapore) Pte. Ltd., dated Jun. 18, 2020.
Motorola Mobility, "On the SCG MPR/A-MPR and Pcmax for EN-DC with Dynamic Power Sharing", R4-1904676, for 3GPP TSG RAN WG4 #90bis, Xi'an, China, Apr. 8-12, 2019.
3GPP TS 38.101-3 V15.4.0 (Dec. 2018), 3rd Generation Partnership Project; Technical Specification Group Radio Access Network; NR; User Equipment (UE) radio transmission and reception; Part 3: Range 1 and Range 2 Interworking operation with other radios (Release 15), 188 pages.
Ericsson et al., "A-MPR for intra-band EN-DC", R4-1813846, Oct. 17, 2018.
Qualcomm Incorporated, "Configured output power for FR1 EN-DC operation", R4-1801948, for 3GPP TSG RAN WG4 #86, Athens, Greece, Feb. 26-Mar. 2, 2018.

* cited by examiner

METHOD AND APPARATUS FOR MANAGING THE MAXIMUM POWER ON A SECONDARY CARRIER

FIELD OF THE INVENTION

The present disclosure is directed to a method and apparatus for managing the maximum power on a secondary carrier, including an upper bound of the maximum power.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Evolved Universal Terrestrial Radio Access (E-UTRA), Long Term Evolution (LTE), Universal Mobile Telecommunications Service (UMTS), Global System for Mobile Communication (GSM), and/or Enhanced Data GSM Environment (EDGE).

In order to support greater data throughputs, service providers have been increasingly looking at techniques which extend the available bandwidth that is allowed to be used by a particular user within the system. At least a couple of bandwidth extending techniques include the use of carrier aggregation, dual carrier, and/or dual connectivity, where multiple frequency bands from one or more networks are selected to operate together. For example, by utilizing more than one carrier through carrier aggregation it may be possible to increase the overall transmission bandwidth associated with a particular data channel and correspondingly enhance the data capacity of that channel. Additionally and/or alternatively, a dual or multiple carrier approach can allow two or more spectrum allocations to be paired and/or used in parallel, including spectrum allocations alternatively associated with different standards and/or radio access technologies, which can also be used to support the ability of enhanced and/or more robust data throughput.

Such a possibility might better support the beginning stages of a build out of a network that incorporates the initial adoption for a particular standard, where area coverage for the emerging standard at least initially may be less than complete. During such a period of transition, it may be beneficial to better support the transition to an emerging standard by allowing bearers for the new standard to be supported in conjunction with the infrastructure of the more mature or previously established standard, and/or to supplement coverage of the emerging standard with coexisting communications using the more established standard.

In at least some instances, the network infrastructure supporting each of the standards may be alternatively referred to as a cell group. In some of these instances, one cell group may be prioritized over the other cell group. In such an instance, the prioritized cell group may be referred to as a master cell group and a non-prioritized cell group may be referred to as a secondary cell group.

In instances, where there are multiple connections, where in some instance the separate connections may involve a connection with a different network infrastructure, managing the overall operation of the communication connections in a particular user equipment relative to the potentially multiple networks can present a challenge, as some of the decisions may need to made in an environment where each of the actors may have less than complete information.

The present inventor has recognized that existing specifications may be overly conservative in terms of when a user equipment is allowed to not transmit in the secondary cell group, where it is reasonable for the secondary cell group to know the configured power for the master cell group, which in turn can be used as part of the decision process as to whether to require the user equipment to transmit or not transmit in the secondary cell group

SUMMARY

The present application provides a method in a user equipment for determining an upper bound of a maximum power in the user equipment, which can configure the maximum power in a range that is defined by the upper bound and a lower bound. The method includes determining whether a configured output power for a master cell group in a dual connectivity mode of operation is less than a minimum of a maximum allowed power for a particular serving cell and a maximum allowed combined power. The upper bound of the maximum power in the user equipment is set equal to the minimum of (1) the minimum of the maximum allowed power for the particular serving cell and the maximum allowed combined power, less the configured output power for the master cell group, (2) a maximum allowed power for a secondary cell group, and (3) an adjusted maximum power of a power class of the user equipment, based upon a determination that the configured output power for the master cell group in a dual connectivity mode of operation is less than the minimum of the maximum allowed power for the particular serving cell and the maximum allowed combined power. The upper bound of the maximum power in the user equipment is set equal to zero power, based upon a determination that the configured output power for the master cell group in a dual connectivity mode of operation is not less than the minimum of the maximum allowed power for the particular serving cell and the maximum allowed combined power.

According to another possible embodiment, a user equipment in a communication network is provided. The user equipment includes a transceiver and a controller. The controller determines an upper bound of a maximum power in the user equipment, which can configure the maximum power in a range that is defined by the upper bound and a lower bound, including wherein the controller further determines whether a configured output power for a master cell group in a dual connectivity mode of operation is less than a minimum of a maximum allowed power for a particular serving cell and a maximum allowed combined power. The upper bound of the maximum power in the user equipment is set equal to the minimum of (1) the minimum of the maximum allowed power for the particular serving cell and the maximum allowed combined power, less the configured output power for the master cell group, (2) a maximum allowed power for a secondary cell group, and (3) an adjusted maximum power of a power class of the user equipment, based upon a determination that the configured output power for the master cell group in a dual connectivity mode of operation is less than the minimum of the maximum allowed power for the particular serving cell and the maximum allowed combined power. The upper bound of the maximum power in the user equipment is set equal to zero power, based upon a determination that the configured output power for the master cell group in a dual connectivity mode of operation is not less than the minimum of the maximum allowed power for the particular serving cell and the maximum allowed combined power.

These and other objects, features, and advantages of the present application are evident from the following description of one or more preferred embodiments, with reference to the accompanying drawings.

DETAILED DESCRIPTION OF THE PREFERRED EMBODIMENT(S)

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for managing the maximum power on a secondary carrier.

Figure 1:
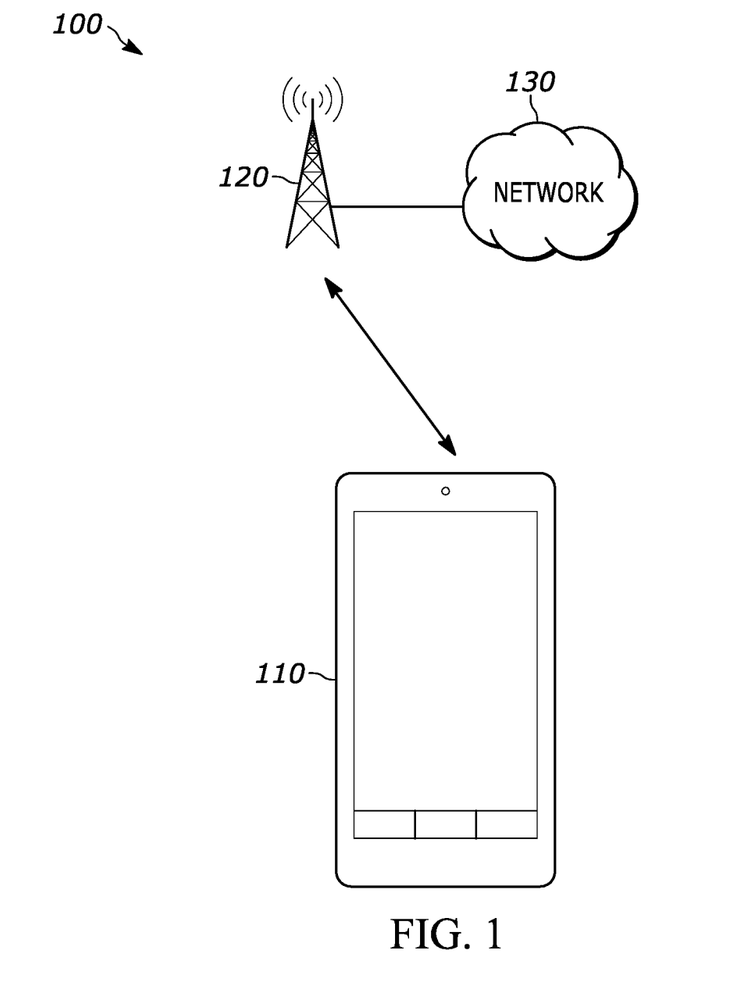
FIG. 1 is a block diagram of an exemplary network environment in which the present invention is adapted to operate.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

Currently, the total power limit is applied to the sum of the configured maximum powers for the two carriers and not to the actual power. As a result, the SCG may be dropped even when the total transmitted power is much less than the limit. Note that conditions 'a' and 'b' below are applied to the maximum configured power. The UE may only be required to transmit the secondary cell group (SCG) in the case that 'a' is false or in the case 'a' is true and 'b' is false. The current understanding in RAN4 is that the user equipment (UE) is generally not required to transmit in the case that 'b' is true.

In accordance with at least some embodiments, it may be possible to incorporate the actual LTE transmission power into the upper bound on Pcmax for the NR carrier as in the following text $P_{CMAX\_H,f,c,NR}=\text{MIN}\{10*\log_{10}(10^{\wedge}(\text{MIN}\{P_{EMAX,c}, P_{EMAX,EN-DC}\}/10)-\hat{P}_{MCG}), P_{NR}, P_{PowerClass}-\Delta P_{PowerClass}\}$. With this change, the total power limit is enforced in the upper limit on Pcmax for the NR carrier. The Pcmax reduction is only enough to meet the total power limit. Furthermore, this limit may have no effect if the NR carrier is power controlled to a value less than this limit; that is, there is no unnecessary scaling or dropping of the NR carrier.

This modification to the upper limit on Pcmax for the NR carrier can be used for both intra-band and inter-band evolved universal terrestrial radio access (E-UTRA) new radio (NR) dual connectivity (EN-DC) operation.

In RAN4#90, it was observed that there are different interpretations on when TS 38.101-3 requires the UE with dynamic power sharing capability to transmit on the SCG for both intra- and inter-band EN-DC. In particular, in the case that b=TRUE in 6.2B.4.1.1 and 6.2B.4.1.3, one interpretation of the specification seems to be that the UE is often allowed to drop the SCG transmission even if no scaling of the UE SCG transmission power $\hat{P}_{SCG}(i_2)$ in slot $i_2$ is required to satisfy the inequality $$\hat{P}_{MCG}(i_1)+\hat{P}_{SCG}(i_2)\leq \hat{P}_{Total}^{EN-DC},$$

where $\hat{P}_{MCG}(i_1)$ is the MCG transmission power in slot $i_1$ and $\hat{P}_{Total}^{EN-DC}$ is the total configured maximum transmission power for EN-DC operation.

At least some embodiments of the present application are directed toward addressing how the definition of maximum power reduction (MPR)/additional maximum power reduction (A-MPR) and maximum configured power (Pcmax) for the SCG can be modified for intra-band EN-DC so as to limit dropping of the SCG to only those instances in which dropping may be necessary to limit the combined transmit power to $\hat{P}_{Total}^{EN-DC}$ or to meet emissions requirements.

The SCG scaling and dropping behavior for EN-DC is described in TS 38.213 as below:
If the UE indicates a capability for dynamic power sharing between E-UTRA and NR for EN-DC and
if UE transmission(s) in subframe $i_1$ of the MCG overlap in time with UE transmission(s) in slot $i_2$ of the SCG in FR1, and
if $\hat{P}_{MCG}(i_1)+\hat{P}_{SCG}(i_2)>\hat{P}_{Total}^{EN-DC}$ in any portion of slot $i_2$ of the SCG,
the UE reduces transmission power in any portion of slot $i_2$ of the SCG so that $\hat{P}_{MCG}(i_1)+\hat{P}_{SCG}(i_2)\leq \hat{P}_{Total}^{EN-DC}$ in any portion of slot $i_2$, where $\hat{P}_{MCG}(i_1)$ and $\hat{P}_{SCG}(i_2)$ are the linear values of the total UE transmission powers in subframe $i_1$ of the MCG and in slot $i_2$ of the SCG in FR1, respectively. The UE is not required to transmit in any portion of slot $i_2$ of the SCG if $\hat{P}_{SCG}(i_2)$ would need to be reduced by more than the value provided by $X_{SCALE}$ in order for $\hat{P}_{MCG}(i_1)+\hat{P}_{SCG}(i_2)\leq \hat{P}_{Total}^{EN-DC}$ in any portion of slot $i_2$ of the SCG. The UE is required to transmit in slot $i_2$ of the SCG if $\hat{P}_{SCG}(i_2)$ would not need to be reduced by more than the value provided by $X_{SCALE}$ in order for $\hat{P}_{MCG}(i_1)+\hat{P}_{SCG}(i_2)\leq \hat{P}_{Total}^{EN-DC}$ in all portions of slot $i_2$.

However, in the case of intra-band EN-DC, the configured maximum powers for the two carriers are not independent even without the limit on the total power $$\hat{P}_{MCG}(i_1)+\hat{P}_{SCG}(i_2)\leq \hat{P}_{Total}^{EN\text{-}DC}. \quad (1)$$

In particular, even before applying the limit on the total power, the transmission powers on each carrier should be less than their respective maximum configured powers, so that $$\hat{P}_{MCG}(i_1)\leq p_{CMAX\_E\text{-}UTRA,c}$$

and $$\hat{P}_{SCG}(i_2)\leq p_{CMAX\_NR,c}$$

where the configured maximum powers $p_{CMAX\_E\text{-}UTRA,c}$ and $p_{CMAX\_NR,c}$, in linear terms, are a function of the MPR/A-MPR that is allowed on each carrier. Depending on how MPR/A-MPR is defined for the SCG, it may be that $p_{CMAX\_NR,c}$ limits $\hat{P}_{SCG}(i_2)$ so that scaling by more than $X_{SCALE}$ is not needed, and thus dropping may not be allowed.

For intra-band carrier aggregation, the MPR/A-MPR needed for each carrier is a function of the RB allocations on both carriers, and thus $P_{CMAX}$ for each carrier is a function of both RB allocations. Furthermore, the MPR/A-MPR needed on the SCG depends on the MPR/A-MPR taken on the MCG. Thus, in the case of intra-band carrier aggregation, the allowed dropping behavior described by The UE is not required to transmit in any portion of slot $i_2$ of the SCG if $\hat{P}_{SCG}(i_2)$ would need to be reduced by more than the value provided by $X_{SCALE}$ in order for $\hat{P}_{MCG}(i_1)+\hat{P}_{SCG}(i_2)\leq \hat{P}_{Total}^{EN\text{-}DC}$ in any portion of slot $i_2$ of the SCG depends upon how MPR/A-MPR is defined for the SCG.

However there are concerns with the existing SCG scaling/dropping conditions in TS 38.101-3.
The condition 'b' is defined in 6.2B.4.1.1 as $$b=10\ \log_{10}[p_{CMAX\_E\text{-}UTRA,c}(p)+p_{CMAX,f,c,NR}(q)/X\_\text{scale}]>P_{EN\text{-}DC,tot\_L}$$

where $$P_{EN\text{-}DC,tot\_L}(p,q)=\text{MIN}\{P_{PowerClass,EN\text{-}DC}-\text{MAX}\{MPR_{tot},A\text{-}MPR_{tot}\},P_{EMAX,EN\text{-}DC}\}$$

In the typical case that $P_{PowerClass,EN\text{-}DC}=P_{EMAX,EN\text{-}DC}$, it follows that $$P_{EN\text{-}DC,tot\_L}(p,q)=P_{PowerClass,EN\text{-}DC}-\text{MAX}\{MPR_{tot},A\text{-}MPR_{tot}\}$$

DC_(N)71AA

For DC_(n)71AA when NS_35 is signaled, it can be observed that $MPR_{tot}=0$ and the minimum value of A-$MPR_{tot}$ for OFDM with dynamic power sharing is 6.5 dB (allocation ratio ≥0.8), so that $$P_{EN\text{-}DC,tot\_L}(p,q)\leq P_{PowerClass,EN\text{-}DC}-6.5\ \text{dB}=16.5\ \text{dBm}.$$

Thus, for DC_(n)71, $P_{EN\text{-}DC,tot\_L}(p,q)$ is generally never more than 16.5 dBm.
Now, $p_{CMAX\_E\text{-}UTRA,c}(p)$ must be greater than or equal to $P_{CMAX\_L\_E\text{-}UTRA,c}$ which is given by $$P_{CMAX\_L\_E\text{-}UTRA,c}=\text{MIN}\{MNP_{EMAX,c},P_{EMAX,EN\text{-}DC},\\ P_{LTE})-\Delta t_{C\_E\text{-}UTRA,c}(P_{PowerClass}-\Delta P_{PowerClass})-\\ \text{MAX}(MPR_c+A\text{-}MPR_c+\Delta T_{IB,c}+\Delta T_{C\_E\text{-}UTRA,c}+\\ \Delta T_{ProSe},P\text{-}MPR_c)\}$$

Since, no A-MPR is defined for LTE Band 71, it follows that $$P_{CMAX\_L\_E\text{-}UTRA,c}\leq P_{PowerClass}-MPR_c=23\ \text{dBm}-5\\ \text{dB}=17\ \text{dBm}$$

where the maximum $MPR_c$ of 5 dB is typically only allowed for 256-QAM, and otherwise is 3 dB or less. As a result, it should be that $$P_{CMAX\_E\text{-}UTRA,c}(p)\geq 17\ \text{dBm}$$

from which it follows that $$10\ \log_{10}[p_{CMAX\_E\text{-}UTRA,c}(p)+p_{CMAX,f,c,NR}(q)/X\_\\ \text{scale}]\geq 10\ \log_{10}[p_{CMAX\_E\text{-}UTRA,c}(p)]\geq 17\ \text{dBm}$$

Since $P_{EN\text{-}DC,tot\_L}(p,q)\leq 16.5$ dBm, it follows that condition 'b' given by $$b=10\ \log_{10}[p_{CMAX\_E\text{-}UTRA,c}(p)+p_{CMAX,f,c,NR}(q)/X\_\text{scale}]>P_{EN\text{-}DC,tot\_L}$$

is generally always true regardless of the value of X_scale. Thus, for DC_(n)71, it seems that the UE is always allowed to drop the SCG transmission when there is an MCG transmission, and this is generally true regardless of the RB allocations, the value of X_scale, and the actual transmission power on the MCG, $\hat{P}_{MCG}$.

General Intra-Band Non-Contiguous EN-DC

For the general intra-band non-contiguous case, the $MPR_{ENDC}$ is typically never less than 15 dB so that $MPR_{tot}=12$ dB. In the case that $P_{LTE}=P_{NR}=P_{ENDC}=23$, we have $$P_{EN\text{-}DC,tot\_L}(p,q)\leq P_{PowerClass,EN\text{-}DC}-12\ \text{dB}=11\ \text{dBm}.$$

As above, in the absence of NS signaling for the LTE carrier, it follows that $$P_{CMAX\_L\_E\text{-}UTRA,c}\leq P_{PowerClass}-MPR_c=23\ \text{dBm}-5\\ \text{dB}=17\ \text{dBm}$$

and thus $$P_{CMAX\_E\text{-}UTRA,c}(p)\geq 17\ \text{dBm}$$

where the maximum $MPR_c$ of 5 dB is typically only allowed for 256-QAM, and otherwise is 3 dB or less.

As a result of the above, condition b is generally always true and the UE is generally always allowed to drop the SCG transmission when there is an MCG transmission, and this is true regardless of the RB allocations, the value of X_scale, and the actual transmission power on the MCG, $\hat{P}_{MCG}$.

General Intra-Band Contiguous EN-DC

For the general intra-band contiguous case, the $MPR_{ENDC}$ is typically never less than 6 dB so that $MPR_{tot}=3$ dB. In the case that $P_{LTE}=P_{NR}=P_{ENDC}=23$, we have $$P_{EN\text{-}DC,tot\_L}(p,q)\leq P_{PowerClass,EN\text{-}DC}-3\ \text{dB}=20\ \text{dBm}.$$

As above, in the absence of NS signaling for the LTE carrier, it follows that $$P_{CMAX\_L\_E\text{-}UTRA,c}\leq P_{PowerClass}-MPR_c=23\ \text{dBm}-5\\ \text{dB}=17\ \text{dBm}$$

and thus $$P_{CMAX\_E\text{-}UTRA,c}(p)\geq 17\ \text{dBm}$$

where the maximum $MPR_c$ of 5 dB is only allowed for 256-QAM, and is otherwise is 3 dB or less. So, for this particular case, the UE may be required to transmit on the SCG depending on the values it chooses for $P_{CMAX\_E\text{-}UTRA,c}$ and $P_{CMAX,f,c,NR}$. For example, it may be that the UE does not need 5 dB of MPR when transmitting 256 QAM and thus chooses $P_{CMAX\_E\text{-}UTRA,c}=21$ dBm, in which case condition 'b' is TRUE and the UE is allowed to drop the SCG transmission. In the same manner, it can be observed that the UE is also allowed to choose $P_{CMAX,f,c,NR}$ larger than the minimum allowed value, $P_{CMAX\_L\_E-UTRA,c}$ and this choice may also trigger the 'b' equal to TRUE condition that allows the SCG transmission to be dropped.

As a result of the above, it follow that even in a general intra-band contiguous case, it may always be possible for the UE to drop the SCG transmission, and this is true regardless of the resource block (RB) allocations, the value of X_scale, and the actual transmission power on the MCG, $\hat{P}_{MCG}$.

Observation 1:

At least for DC_(n)71AA and the general intra-band contiguous and non-contiguous cases above, it seems it generally may always be possible for the UE to drop the MCG transmission, regardless of the RB allocations, the value of X_scale, and the actual transmission power on the MCG, $\hat{P}_{MCG}$.

From Observation 1, it seems that changes are needed to the SCG scaling and dropping conditions for intra-band EN-DC to prevent the UE from dropping the SCG transmission whenever there is an MCG transmission.

According to a possible embodiment, there are multiple options for defining MPR/A-MPR for the SCG and for enforcing the total power constraint. For inter-band EN-DC, the MPR/A-MPR values can be defined independently for the two carriers to meet emissions requirements, after which the total power constraint can be applied to either the sum of either the actual transmission powers or the sum of the maximum configured powers.

For intra-band EN-DC, the situation may be more complicated. As currently implemented in TS 38.101-3, the SCG MPR/A-MPR that is defined may not be sufficient on its own to ensure that all emissions requirements are met, and as a result, the power reduction needed to meet emissions requirements is enforced by subtracting the total MPR/A-MPR from the total power constraint $\hat{P}_{Total}^{EN-DC}$ and using conditions 'a' and 'b'.

Options for Defining the SCG MPR/A-MPR

There are at least three options for defining MPR/A-MPR for the SCG, as listed below:

Option 1: The SCG MPR/A-MPR is chosen to be the stand-alone MPR/A-MPR in TS 38.101-1.

This MPR/A-MPR choice is used for inter-band EN-DC, but is not feasible for intra-band EN-DC since the MPR/A-MPR taken on one carrier effects the MPR/A-MPR that is needed on the other carrier.

Option 2: The EN-DC MPR/A-MPR that applies to the SCG with dynamic power sharing but without LTE prioritization. This MPR/A-MPR depends on both the MCG and the SCG RB allocations.

In Rel-15, this approach is used for DC_(n)41, DC_41_n41, and for when NS_01 is signaled. This approach is not used for DC_(n)71. For DC_(n)71, the SCG A MPR is the A-MPR that is needed for the combined power for both carriers, and which is less than the A-MPR that is needed for the SCG carrier without LTE prioritization. (In any case, as is shown above, the UE is currently always allowed to drop the SCG for DC_(n)71.)

With this approach, the MPR/A-MPR taken on NR may not be sufficient to meet emissions requirement if the MCG is transmitting at its maximum allowed power with the LTE stand-alone MPR/A-MPR. As a result, for intra-band EN-DC, the power reduction needed to meet emissions requirements is combined with the total power constraint by reducing the total power constraint $\hat{P}_{Total}^{EN-DC}$ by the total MPR/A-MPR as below $P_{EN-DC,tot\_L}(p,q) = \text{MIN}\{P_{PowerClass,EN-DC} - \text{MAX}\{MPR_{tot}, A\text{-}MPR_{tot}\}, P_{EMAX,EN-DC}\}$ Option 3: The SCG MPR/A-MPR is chosen as the power reduction necessary to ensure the emissions requirements are met. In this case, the MPR/A-MPR for the SCG is defined as the difference between $P_{PowerClass,EN-DC}$ and the remaining power, where the remaining power is the difference between $P_{PowerClass,EN-DC}$ reduced by the total MPR/A-MPR and $\hat{P}_{MCG}$, the transmission power on the MCG (not the maximum configured power).

With Option 3, it may no longer be necessary to reduce $P_{EN-DC,tot\_L}$ by MAX{$MPR_{tot}$, $A\text{-}MPR_{tot}$} in order to meet emissions requirements, so instead $P_{EN-DC,tot\_L}(p,q) = \text{MIN}\{P_{PowerClass,EN-DC}, P_{EMAX,EN-DC}\}$ which is the same as for inter-band EN-DC.

In 38.101-3 Rel-15, the MPR/A-MPR for the SGG does not depend on $\hat{P}_{MCG}$. However, the existing SCG MPR/A-MPR currently depends on the RB allocation for the MCG. Furthermore, the value of the $\hat{P}_{MCG}$ can be determined at the same time as the RB allocation for the MCG, and so it seems reasonable that the MPR/A-MPR, $P_{CMAX\_L,NR}$, and $P_{CMAX\_H,NR}$ for the SCG can be defined to depend on $\hat{P}_{MCG}$, also.

Proposal 1:

For intra-band EN-DC, define MPR/A-MPR for the SCG as in Option 3.

Defining PCMAX for the SCG

With the modification of A-MPR for the SCG in Proposal 1 and the resulting value of $P_{CMAX\_L,f,c,NR}$, the SCG is allowed to take only enough MPR/A-MPR to ensure that emissions requirements can be met. However, there is still the possibility that the total power can exceed the total power limit $\hat{P}_{Total}^{EN-DC}$. To prevent this possibility, the total power constraint can be added to the definition of $P_{CMAX\_H,f,c,NR}$ as in Proposal 2.

Proposal 2:

Define $P_{CMAX\_H,f,c,NR}$ as below if $10*\log_{10}(\hat{P}_{MCG}) \leq 10^\wedge(\text{MIN}\{P_{EMAX,c}, P_{EMAX,EN-DC}\}/10)$ then $P_{CMAX\_H,f,c,NR} = \text{MIN}\{10*\log_{10}(10^\wedge(\text{MIN}\{P_{EMAX,c}, P_{EMAX,EN-DC}\}/10) - \hat{P}_{MCG}), P_{NR}, P_{PowerClass}\Delta P_{PowerClass}\}$ else $P_{CMAX\_H,f,c,NR} = -\text{infinite}$ where $\hat{P}_{MCG}$ is the configured output power for the MCG in linear terms.

With this change, the total power constraint is enforced on the SCG, and if necessary, the SCG transmission can be dropped.

Figure 2:
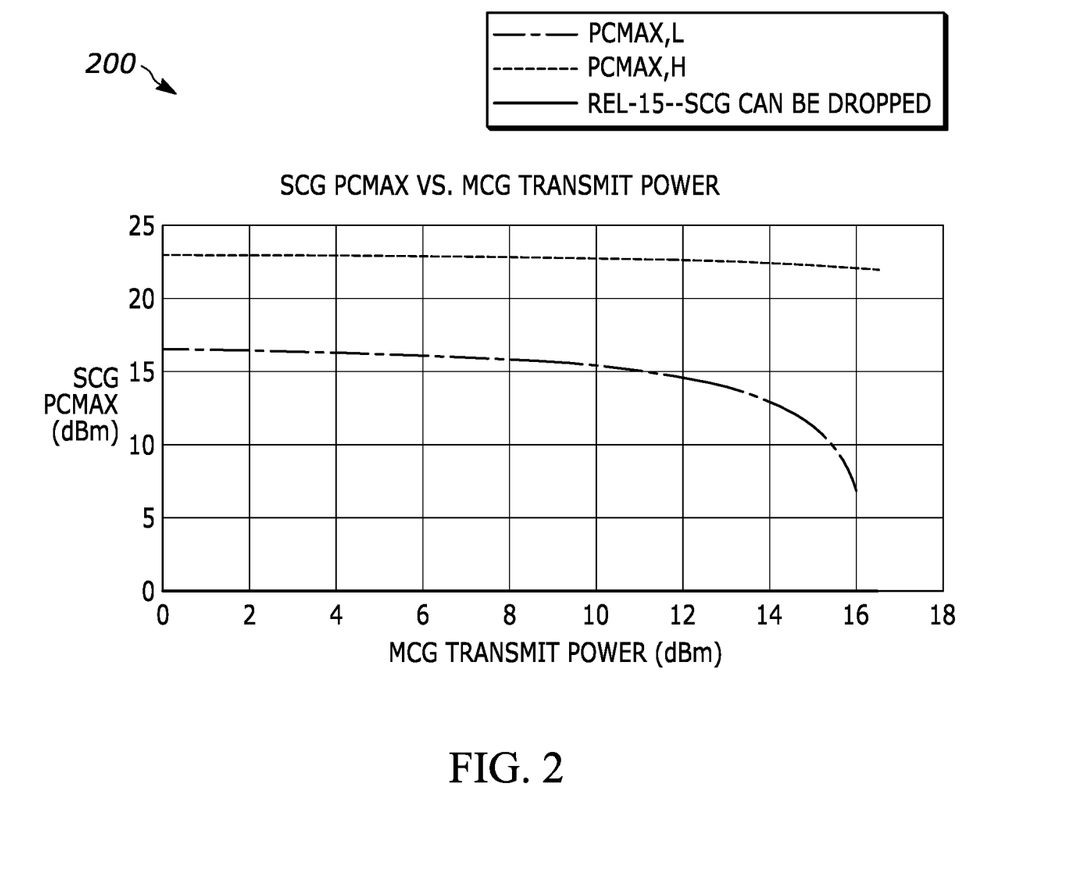
FIG. 2 is a graph of secondary cell group (SCG) Pcmax,L and Pcmax,H vs. master cell group (MCG) transmit power for DC_(n)71 with Proposals 1 and 2.

FIG. 2 illustrates a graph 200 of SCG Pcmax,L and Pcmax,H vs. MCG transmit power for DC_(n)71 with Proposals 1 and 2 (with Rel-15, SCG can generally always be dropped for DC_(n)71).

In FIG. 2, $P_{CMAX\_L,NR}$ and $P_{CMAX\_H,NR}$ are shown for DC_(n)71 with Proposals 1 and 2, respectively, as a function of MCG transmission power $\hat{P}_{MCG}$ for a full allocation for which the total A-MPR is 6.5 dB (CP-OFDM). As noted previously, the UE is generally always allowed to drop the SCG and so for the current specification, the minimum power for the SCG is no power at all.

Some of the changes needed to implement Proposals 1 and 2 for intra-band EN-DC are shown in the below examples.

It should be noted that with Proposals 1 and 2, there is no specific dropping criteria for the SCG other than the SCG may be dropped if $p_{CMAX,L,NR}$(linear terms) is 0, and the SCG must be dropped if $p_{CMAX,H,NR}$ (linear terms) is 0. As a result, for intra-band EN-DC it may be useful to have another dropping criteria such as a threshold power or PSD below which the SCG may be dropped. Alternatively, a dropping threshold could be defined for the maximum PSD difference between the MCG and the SCG.

In the present application, it has been shown that there can be issues with the current implementation of dynamic power sharing for intra-band EN-DC in that the UE is often allowed to drop the SCG transmission even if no scaling of the UE SCG transmission power $\hat{P}_{SCG}(i_2)$ in slot $i_2$ is required to satisfy the inequality $$\hat{P}_{MCG}(i_1)+\hat{P}_{SCG}(i_2) \le \hat{P}_{Total}^{EN-DC},$$

To address this problem, it has been proposed that the MPR/A-MPR for the SCG be modified as in Proposal 1 and that $P_{CMAX\_H,NR}$ for the SCG be modified as in Proposal 2.

Proposal 1:
For intra-band EN-DC, define MPR/A-MPR for the SCG as in Option 3.

Proposal 2:
Define $P_{CMAX\_H,f,c,NR}$ as below
if $10*\log_{10}(\hat{P}_{MCG}) \le 10^{\wedge}(MIN\{P_{EMAX,c}, P_{EMAX,EN-DC}\}/10)$ then $$P_{CMAX\_H,f,c,NR}=MIN\{10*\log_{10}(10^{\wedge}(MIN\{P_{EMAX,c},\\ P_{EMAX,EN-DC}\}/10)-\hat{P}_{MCG}),P_{NR},P_{PowerClass}-\\ \Delta P_{PowerClass}\}$$

else $$P_{CMAX\_H,f,c,NR}=-\text{infinite}$$

where $\hat{P}_{MCG}$ is the configured output power for the MCG in linear terms Some examples of how the definition for how the upper bound of the maximum power, namely $P_{CMAX\_H,f,c,NR}$, can be modified in TS 38-101 is shown below.

Example 1

6.2B.2 UE Maximum Output Power Reduction for EN-DC
6.2B.2.0 General

The UE maximum output power reduction (MPR) specified in this subclause is applicable for UEs configured with EN-DC when NS_01 is indicated in the MCG and the SCG. The MPR applies subject to indication in the field modifiedMPRbehavior for the SCG in accordance with 3GPP TS 36.101: "Evolved Universal Terrestrial Radio Access (E-UTRA); User Equipment (UE) radio transmission and reception".

6.2B.2.1 Intra-Band Contiguous EN-DC
6.2B.2.1.1 General

When the UE is configured for intra-band contiguous EN-DC, the UE determines the total allowed maximum output power reduction as specified in this subclause.

For UE supporting dynamic power sharing the following:
for the MCG, $MPR_c$ in accordance with 3GPP TS 36.101: "Evolved Universal Terrestrial Radio Access (E-UTRA); User Equipment (UE) radio transmission and reception"
for the SCG, $$MPR_{NR}=MAX(MPR_{single,NR},MPR_{ENDC})$$

if $10*\log_{10}(\hat{P}_{MCG})<P_{PowerClass,EN-DC}-MPR_{tot}$, then $$MPR'_c=MIN(P_{EMAX,c},P_{EMAX,EN-DC},P_{NR})-10*\log_{10}\\ (10^{\wedge}(P_{PowerClass,EN-DC}-MPR_{tot})/10)-\hat{P}_{MCG})$$

else $MPR'_c=$infinite, where $\hat{P}_{MCG}$ is the configured output power for the MCG in linear terms
for the total configured transmission power, $$MPR_{tot}P_{PowerClass,EN-DC}-\min(P_{PowerClass,EN-DC},\\ 10*\log_{10}(10^{\wedge}((P_{PowerClass,E-UTRA}-MPR_{E-UTRA})/\\ 10)+10^{\wedge}((P_{PowerClass,NR}-MPR_{NR})/10))$$

where $$MPR_{E-UTRA}=MAX(MPR_{single,E-UTRA},MPR_{ENDC})$$

with
$MPR_{single,E-UTRA}$ is the MPR defined for the E-UTRA transmission in accordance with 3GPP TS 36.101: "Evolved Universal Terrestrial Radio Access (E-UTRA); User Equipment (UE) radio transmission and reception"
$MPR_{single,NR}$ is the MPR defined for the NR transmission in accordance with 3GPP TS 36.101: "Evolved Universal Terrestrial Radio Access (E-UTRA); User Equipment (UE) radio transmission and reception"

For UEs not supporting dynamic power sharing the following
for the MCG, $$MPR_c=MAX(MPR_{single,E-UTRA},MPR_{ENDC})$$

for the SCG, $$MPR'_c=MAX(MPR_{single,NR},MPR_{ENDC})$$

where
$MPR_{single,NR}$ is the MPR defined for the NR transmission in accordance with 3GPP TS 36.101: "Evolved Universal Terrestrial Radio Access (E-UTRA); User Equipment (UE) radio transmission and reception"
$MPR_{single,E-UTRA}$ is the MPR defined for the E-UTRA transmission in accordance with 3GPP TS 36.101: "Evolved Universal Terrestrial Radio Access (E-UTRA); User Equipment (UE) radio transmission and reception"
$MPR_{END}c$ is defined in Subclause 6.2B.2.1.2

Example 2

| | |
|---|---|
| 6.2B.2.1.2 | MPR for power class 3 and power class 2 |
| 6.2B.2.2 | Intra-band non-contiguous EN-DC |
| 6.2B.2.2.1 | General |

When the UE is configured for intra-band non-contiguous EN-DC, the UE determines the total allowed maximum output power reduction as specified in this subclause.

For UE supporting dynamic power sharing the following:
for the MCG, MPR, in accordance with 3GPP TS 36.101: "Evolved Universal Terrestrial Radio Access (E-UTRA); User Equipment (UE) radio transmission and reception"
for the SCG, $$MPR_{NR}=MAX(MPR_{single,NR},MPR_{ENDC})$$

if $10*\log_{10}(P_{PowerClass,EN-DC}-MPR_{tot})$, then $$MPR'_c=MIN(P_{EMAX,c},P_{EMAX,EN-DC},P_{NR})-10*\log_{10}\\ (10^{\wedge}((P_{PowerClass,EN-DC}-MPR_{tot})/10)-\hat{P}_{MCG})$$

else $MPR'_c=$infinite, where $\hat{P}_{MCG}$ is the configured output power for the MCG in linear terms for the total configured transmission power, $$MPR_{tot}=P_{PowerClass,EN-DC}-\min(P_{PowerClass,EN-DC},$$
$$10*\log_{10}(10^{\wedge}((P_{PowerClass,E-UTRA}-MPR_{E-UTRA})/$$
$$10)+10^{\wedge}((P_{PowerClass,NR}-MPR_{NR})/10))$$

where $$MPR_{E-UTRA}=\text{MAX}(MPR_{single,E-UTRA},MPR_{ENDC})$$

with
  MPR$_{single,E-UTRA}$ is the MPR defined for the E-UTRA transmission in accordance with 3GPP TS 36.101: "Evolved Universal Terrestrial Radio Access (E-UTRA); User Equipment (UE) radio transmission and reception"
  MPR$_{single,NR}$ is the MPR defined for the NR transmission in accordance with 3GPP TS 36.101: "Evolved Universal Terrestrial Radio Access (E-UTRA); User Equipment (UE) radio transmission and reception"

For UEs not supporting dynamic power sharing the following
  for the MCG, $$MPR_c=\text{MAX}(MPR_{single,E-UTRA},MPR_{ENDC})$$

for the SCG, $$MPR'_c=\text{MAX}(MPR_{single,NR},MPR_{ENDC})$$

where
  MPR$_{single,NR}$ is the MPR defined for the NR transmission in accordance with 3GPP TS 36.101: "Evolved Universal Terrestrial Radio Access (E-UTRA); User Equipment (UE) radio transmission and reception"
  MPR$_{single,E-UTRA}$ is the MPR defined for the E-UTRA transmission in accordance with 3GPP TS 36.101: "Evolved Universal Terrestrial Radio Access (E-UTRA); User Equipment (UE) radio transmission and reception"

MPR$_{ENDC}$ is defined in Subclause 6.2B.2.2.2

6.2B.2.2.2 MPR for power class 3 and power class 2

Example 3

6.2B.3.1.1 A-MPR for DC_(n)71AA

For UE supporting dynamic power sharing the following:
  for the MCG, A-MPR, in accordance with 3GPP TS 36.101: "Evolved Universal Terrestrial Radio Access (E-UTRA); User Equipment (UE) radio transmission and reception"
  for the SCG,
    if $10*\log_{10}(\hat{P}_{MCG})<(P_{PowerClass,EN-DC}-\text{A-MPR}_{tot})$, then $$A\text{-}MPR'_c=\text{MIN}(P_{EMAX,c},P_{EMAX,EN-DC},P_{NR})-10*\log_{10}$$
$$(10^{\wedge}((P_{PowerClass,EN-DC}-A\text{-}MPR_{tot})/10)-\hat{P}_{MCG})$$

else $$A\text{-}MPR'_c=\text{infinite},$$

where $\hat{P}_{MCG}$ is the configured output power for the MCG in linear terms for the total configured transmission power, A-MPR$_{tot}$=A-MPR$_{DC}$ with A-MPR$_D$c as defined in this sub-clause.

For UEs not supporting dynamic power sharing the following
  for the MCG, $$A\text{-}MPR_c=A\text{-}MPR_{LTE}$$

for the SCG, $$A\text{-}MPR'_c=A\text{-}MPR_{NR}$$

with A-MPR$_{Lm}$ and A-MPR$_{NR}$ as defined in this sub-clause. For DC_(n)71AA with configured with network signaling values as per Table 6.2B.3.1.1-1 the allowed A-MPR is defined by
  for UE indicating support of dynamicPowerSharing in the UE-MRDC-Capability IE $$A\text{-}MPR_{DC}=\text{CEIL}\{M_{A,DC}(A),0.5\}$$

where A-MPR$_{DC}$ is the total power reduction allowed (dB),
for OFDM:

| | |
|---|---|
| M$_{A,DC}$ = 11.00 − 11.67*A; | 0.00 < A ≤ 0.30 |
| 8.10 − 2.00*A; | 0.30 < A ≤ 0.80 |
| 6.50; | 0.80 < A ≤ 1.00 | for DFT-S-OFDM:

| | |
|---|---|
| M$_{A,DC}$ = 11.00 − 13.33*A; | 0.00 < A ≤ 0.30 |
| 8.00 − 3.33*A; | 0.30 < A ≤ 0.60 |
| 6.00; | 0.60 < A ≤ 1.00 | where $$A = \frac{L_{CRB,LTE} + L_{CRB,NR}}{N_{RB,LTE} + N_{RB,NR}}$$

with L$_{CRB}$ and N$_{RB}$ the number of allocated PRB and transmission bandwidth for the respective CG,
for UE not indicating support of dynamicPowerSharing $$A\text{-}MPR_{LTE}=\text{CEIL}\{M_{A,LTE},0.5\}$$

$$A\text{-}MPR_{NR}=\text{CEIL}\{M_{A,NR},0.5\}$$

where A-MPR is the total power reduction allowed per CG with $$M_{A,LTE} = M_{A,DC}(A_{LTE,wc}) - 1 - \Delta_{LTE}$$

$$M_{A,NR} = M_{A,DC}(A_{NR,wc}) - 1 - \Delta_{NR}$$

$$A_{LTE,wc} = \frac{L_{CRB,LTE} + 1}{N_{RB,LTE} + N_{RB,NR}}$$

$$A_{NR,wc} = \frac{1 + L_{CRB,NR}}{N_{RB,LTE} + N_{RB,NR}}$$

$$\Delta_{LTE} = 10 \log_{10} \frac{N_{RB,LTE}}{N_{RB,LTE} + N_{RB,NR}}$$

$$\Delta_{NR} = 10 \log_{10} \frac{N_{RB,NR}}{N_{RB,LTE} + N_{RB,NR}}$$

6.2B.3.1.2 A-MPR for NS_04
6.2B.3.1.2.0 General
When the UE is configured for B41/n41 intra-band contiguous EN-DC and it receives IE NS_04, the UE determines the total allowed maximum output power reduction as specified in this subclause. The A-MPR for EN-DC defined in this section is used instead of MPR defined in 6.2B.2.2, not additively, so EN-DC MPR=0 when NS_04 is signaled.

For UE supporting dynamic power sharing the following:
for the MCG, A-MPR, in accordance with 3GPP TS 36.101: "Evolved Universal Terrestrial Radio Access (E-UTRA); User Equipment (UE) radio transmission and reception"
for the SCG, $$A\text{-}MPR_{NR}=\text{MAX}(A\text{-}MPR_{single,NR}, A\text{-}MPR_{IM3})$$

if $10*\log_{10}(\hat{P}_{MCG}) < (P_{PowerClass,EN\text{-}DC} - A\text{-}MPR_{tot})$, then $$A\text{-}MPR'_c = \text{MIN}(P_{EMAX,c}, P_{EMAX,EN\text{-}DC}, P_{NR}) - 10*\log_{10}(10^{\wedge}((P_{PowerClass,EN\text{-}DC} - A\text{-}MPR_{tot})/10) - \hat{P}_{MCG})$$

else $$A\text{-}MPR'_c = \text{infinite},$$

where $\hat{P}_{MCG}$ is the configured output power for the MCG in linear terms
for the total configured transmission power, $$A\text{-}MPR_{tot} = P_{PowerClass,EN\text{-}DC} - \min(P_{PowerClass,EN\text{-}DC}, 10*\log_{10}(10^{\wedge}((P_{PowerClass,E\text{-}UTRA} - A\text{-}MPR_{E\text{-}UTRA})/10) + 10^{\wedge}((P_{PowerClass,NR} - A\text{-}MPR_{NR})/10)))$$

where $$A\text{-}MPR_{E\text{-}UTRA} = \text{MAX}(A\text{-}MPR_{single,E\text{-}UTRA} + MPR_{single,E\text{-}UTRA}, A\text{-}MPR_{IM3})$$

with
  A-MPR$_{single,E\text{-}UTRA}$ is the A-MPR defined for the E-UTRA transmission in accordance with 3GPP TS 36.101: "Evolved Universal Terrestrial Radio Access (E-UTRA); User Equipment (UE) radio transmission and reception"
  A-MPR$_{single,NR}$ is the A-MPR defined for the NR transmission in accordance with 3GPP TS 36.101: "Evolved Universal Terrestrial Radio Access (E-UTRA); User Equipment (UE) radio transmission and reception"
  MPR$_{single,E\text{-}UTRA}$ is the MPR defined for the E-UTRA transmission in accordance with 3GPP TS 36.101: "Evolved Universal Terrestrial Radio Access (E-UTRA); User Equipment (UE) radio transmission and reception"

For UEs not supporting dynamic power sharing the following
for the MCG, $$A\text{-}MPR_c = \text{MAX}(A\text{-}MPR_{single,E\text{-}UTRA} + MPR_{single,E\text{-}UTRA}, A\text{-}MPR_{IM3})$$

for the SCG, $$A\text{-}MPR'_c = \text{MAX}(A\text{-}MPR_{single,NR}, A\text{-}MPR_{IM3})$$

where
  A-MPR$_{single,E\text{-}UTRA}$ is the A-MPR defined for the E-UTRA transmission in accordance with 3GPP TS 36.101: "Evolved Universal Terrestrial Radio Access (E-UTRA); User Equipment (UE) radio transmission and reception"
  A-MPR$_{single,NR}$ is the A-MPR defined for the NR transmission in accordance with 3GPP TS 36.101: "Evolved Universal Terrestrial Radio Access (E-UTRA); User Equipment (UE) radio transmission and reception"
  MPR$_{single,E\text{-}UTRA}$ is the MPR defined for the E-UTRA transmission in accordance with 3GPP TS 36.101: "Evolved Universal Terrestrial Radio Access (E-UTRA); User Equipment (UE) radio transmission and reception"

The UE determines the Channel Configuration Case and the value of A-MPR$_{IM3}$ as follows:
  If $F_{IM3,low\_block,low} < 2490.5$ MHz
    Channel Configuration Case B. A-MPR$_{IM3}$ defined in Subclause 6.2B.3.1.2.2
  Else
    Channel Configuration Case A. A-MPR$_{IM3}$ defined in Subclause 6.2B.3.1.2.1
  where
    $F_{IM3mlow\_block,low} = (2*F_{low\_channel,low\_edge}) - F_{high\_channel,high\_edge}$
    $F_{low\_channel,low\_edge}$ is the lowermost frequency of lower transmission bandwidth configuration.
    $F_{high\_channel,high\_edge}$ is the uppermost frequency of upper transmission bandwidth configuration.
  6.2B.3.1.2.1 A-MPR$_{IM3}$ for NS_04 to Meet −13 dBm/1 MHz for 26 dBm UE Power Example 4

6.2B.3.2.1 A-MPR for NS_04
When the UE is configured for B41/n41 intra-band non-contiguous EN-DC and it receives IE NS_04, the UE determines the total allowed maximum output power reduction as specified in this subclause. The A-MPR for EN-DC defined in this section is used instead of MPR defined in 6.2B.2.2, not additively, so EN-DC MPR=0 when NS_04 is signaled.

For UE supporting dynamic power sharing the following:
for the MCG, A-MPR, in accordance with 3GPP TS 36.101: "Evolved Universal Terrestrial Radio Access (E-UTRA); User Equipment (UE) radio transmission and reception"
for the SCG, $$A\text{-}MPR_{NR} = \text{MAX}(A\text{-}MPR_{single,NR}, A\text{-}MPR_{EN\text{-}DC})$$

if $10*\log_{10}(\hat{P}_{MCG}) < P_{PowerClass,EN\text{-}DC} - A\text{-}MPR_{tot}$, then $$A\text{-}MPR'_c = \text{MIN}(P_{EMAX,c}, P_{EMAX,EN\text{-}DC}, P_{NR}) - 10*\log_{10}(10^{\wedge}((P_{PowerClass,EN\text{-}DC} - A\text{-}MPR_{tot})/10) - \hat{P}_{MCG})$$

else $$A\text{-}MPR'_c = \text{infinite},$$

where $\hat{P}_{MCG}$ is the configured output power for the MCG in linear terms
for the total configured transmission power, $$A\text{-}MPR_{tot} = P_{PowerClass,EN\text{-}DC} - \min(P_{PowerClass,EN\text{-}DC}, 10*\log_{10}(10^{\wedge}((P_{PowerClass,E\text{-}UTRA} - A\text{-}MPR_{E\text{-}UTRA})/10) + 10^{\wedge}((P_{PowerClass,NR} - A\text{-}MPR_{NR})/10)))$$

where $$A\text{-}MPR_{E\text{-}UTRA} = \text{MAX}(A\text{-}MPR_{single,E\text{-}UTRA} + MPR_{single,E\text{-}UTRA}, A\text{-}MPR_{EN\text{-}DC})$$

$$A\text{-}MPR_{EN\text{-}DC} = \text{MAX}(A\text{-}MPR_{IM3}, A\text{-}MPR_{ACLRoverlap})$$

with
  A-MPR$_{single,E\text{-}UTRA}$ is the A-MPR defined for the E-UTRA transmission in accordance with 3GPP TS 36.101: "Evolved Universal Terrestrial Radio Access (E-UTRA); User Equipment (UE) radio transmission and reception"
  A-MPR$_{single,NR}$ is the A-MPR defined for the NR transmission in accordance with 3GPP TS 36.101: "Evolved Universal Terrestrial Radio Access (E-UTRA); User Equipment (UE) radio transmission and reception"

MPR$_{single,E\text{-}UTRA}$ is the MPR defined for the E-UTRA transmission in accordance with 3GPP TS 36.101: "Evolved Universal Terrestrial Radio Access (E-UTRA); User Equipment (UE) radio transmission and reception"

For UEs not supporting dynamic power sharing the following for the MCG, $$A\text{-}MPR_c = MAX(A\text{-}MPR_{single,E\text{-}UTRA} + MPR_{single,E\text{-}UTRA}, A\text{-}MPR_{IM3}, A\text{-}MPR_{ACLRoverlap})$$

for the SCG, $$A\text{-}MPR'_c = MAX(A\text{-}MPR_{single,NR}, A\text{-}MPR_{IM3}, A\text{-}MPR_{ACLRoverlap})$$

where

A-MPR$_{single,E\text{-}UTRA}$ is the A-MPR defined for the E-UTRA transmission in accordance with 3GPP TS 36.101: "Evolved Universal Terrestrial Radio Access (E-UTRA); User Equipment (UE) radio transmission and reception"

A-MPR$_{single,NR}$ is the A-MPR defined for the NR transmission in accordance with 3GPP TS 36.101: "Evolved Universal Terrestrial Radio Access (E-UTRA); User Equipment (UE) radio transmission and reception"

MPR$_{single,E\text{-}UTRA}$ is the MPR defined for the E-UTRA transmission in accordance with 3GPP TS 36.101: "Evolved Universal Terrestrial Radio Access (E-UTRA); User Equipment (UE) radio transmission and reception"

The UE determines the Channel Configuration Case and the value of A-MPR$_{IM3}$ as follows:

If AND(F$_{IM3,low\_block,high}$<F$_{filter,low}$,MAX(SEM$_{-13,high}$, F$_{IM3,high\_block,low}$)>F$_{filter,high}$)

Channel Configuration Case C. A-MPR$_{IM3}$ defined in Subclause 6.2B.3.1.2.1

Else

Channel Configuration Case D. A-MPR$_{IM3}$ defined in Subclause 6.2B.3.1.2.2 where $$F_{IM3,low\_block,high} = (2 * F_{low\_channel,high\_edge}) - F_{high\_channel,low\_edge}$$

$$F_{IM3,high\_block,low} = (2 * F_{high\_channel,low\_edge}) - F_{low\_channel,high\_edge}$$

F$_{low\_channel,low\_edge}$ is the lowermost frequency of lower transmission bandwidth configuration.

F$_{low\_channel,high\_edge}$ is the uppermost frequency of lower transmission bandwidth configuration.

F$_{high\_channel,low\_edge}$ is the lowermost frequency of upper transmission bandwidth configuration.

F$_{high\_channel,high\_edge}$ is the uppermost frequency of upper transmission bandwidth configuration.

F$_{filter,low}$=2480 MHz

F$_{filter,high}$=2745 MHz

SEM$_{-13,high}$=Threshold frequency where upper spectral emission mask for upper channel drops from −13 dBm/1 MHz to −25 dBm/1 MHz, as specified in Subclause 6.5B.2.1.2.2.

The UE determines the value of A-MPR$_{ACLRoverlap}$ as specified in Table 6.2B.3.2.1-1:

TABLE 6.2B.3.2.1-1

| W$_{gap}$ | A-MPR$_{ACLRoverlap}$ |
|---|---|
| <BW$_{channel, E\text{-}UTRA}$ + BW$_{channel, NR}$ | 4 dB |
| ≥BW$_{channel, E\text{-}UTRA}$ + BW$_{channel, NR}$ | 0 dB |

NOTE 1:
W$_{gap}$ = F$_{high\_channel, low\_edge}$ − F$_{low\_channel, high\_edge}$ 6.2B.3.3 Inter-Band EN-DC within FR1

Example 5

6.2B.4 Configured output power for EN-DC
6.2B.4.1 Configured output power level
6.2B.4.1.1 Intra-band contiguous EN-DC The following requirements apply for one component carrier per CG configured for synchronous DC.

For intra-band dual connectivity with one uplink serving cell per CG on E-UTRA and NR respectively, the UE is allowed to set its configured maximum output power P$_{CMAX,c(i),i}$ for serving cell c(i) of CG i, i=1,2, and its total configured maximum transmission power for EN-DC operation $\hat{P}_{Total}^{EN\text{-}DC}$.

The configured maximum output power P$_{CMAX\_E\text{-}UTRA,c}$ (p) in sub-frame p for the configured E-UTRA uplink carrier shall be set within the bounds:

$$P_{CMAX\_L\_E\text{-}UTRA,c}(P) \leq P_{CMAX\_E\text{-}UTRA,c}(P) \leq P_{CMAX\_H\_E\text{-}UTRA,c}(p)$$

where P$_{CMAX\_L\_E\text{-}UTRA,c}$ and P$_{CMAX\_H\_E\text{-}UTRA,c}$ are the limits for a serving cell c as specified in TS 36.101 sub-clause 6.2.5 modified by P$_{LTE}$ as follows:

$$P_{CMAX\_L\_E\text{-}UTRA,c} = MIN\{MIN(P_{EMAX,c}, P_{EMAX,EN\text{-}DC}, P_{LTE}) - \Delta t_{C\_E\text{-}UTRA,c}, (P_{PowerClass} - \Delta P_{PowerClass}) - MAX(MPR_c + A\text{-}MPR_c + \Delta T_{IB,c} + \Delta T_{C\_E\text{-}UTRA,c} + \Delta T_{ProSe}, P\text{-}MPR_c)\}$$

$$P_{CMAX\_H\_E\text{-}UTRA,c} = MIN\{P_{EMAX,c}, P_{EMAX,EN\text{-}DC}, P_{LTE}, P_{PowerClass} - \Delta P_{PowerClass}\}$$

and whenever NS_01 is not indicated within CG 1:
  for a UE indicating support of dynamicPowerSharing, the A-MPR$_c$ is determined in accordance with the DCI of serving cell c of the CG 1 and the specification in sub-clause 6.2.4 of 3GPP TS 36.101: "Evolved Universal Terrestrial Radio Access (E-UTRA); User Equipment (UE) radio transmission and reception";
  for a UE not indicating support of dynamicPowerSharing, the A-MPR$_c$ is determined in accordance with sub-clause 6.2B.3.1 with parameters applicable for UEs not indicating support of dynamicPowerSharing and MPR$_c$=0 dB;

and whenever NS_01 is indicated in CG 1:
  for a UE indicating support of dynamicPowerSharing, the MPR$_c$ is determined in accordance with the DCI of serving cell c of the CG 1 and the specification in sub-clause 6.2.4 of 3GPP TS 36.101: "Evolved Universal Terrestrial Radio Access (E-UTRA); User Equipment (UE) radio transmission and reception";
  for a UE not indicating support of dynamicPowerSharing, the MPR$_c$ is determined in accordance with sub-clause 6.2B.2.1 with parameters applicable for UEs not indicating support of dynamicPowerSharing and A-MPR$_c$=0 dB;

The configured maximum output power $P_{CMAX\_NR,c}(q)$ in physical channel q for the configured NR carrier shall be set within the bounds:

$$P_{CMAX\_L,f,c,NR}(q) \leq P_{CMAX,f,c,NR}(q) \leq P_{CMAX\_H,f,c,NR}(q)$$

where $P_{CMAX\_L\_NR,c}$ and $P_{CMAX\_H\_NR,c}$ are the limits for a serving cell c as specified in sub-clause 6.2.4 of TS 38.101-1 modified by $P_{NR}$ as follows:

$$P_{CMAX\_L,f,c,NR} = \text{MIN}\{\text{MIN}(P_{EMAX,c}, P_{EMAX,EN-DC}, P_{NR}) - \Delta T_{C\_NR,c}, (P_{PowerClass} - \Delta P_{PowerClass}) - \text{MAX}(MPR_c + A\text{-}MPR_c + \Delta T_{IB,c} + \Delta T_{C\_NR,c} + \Delta T_{RxSRS}, P\text{-}MPR_c)\}$$

if $10 * \log_{10}(\hat{P}_{MCG}) \leq 10^{\wedge}(\text{MIN}\{P_{EMAX,c}, P_{EMAX,EN-DC}\}/10)$
then $$P_{CMAX\_H,f,c,NR} = \text{MIN}\{10*\log_{10}(10^{\wedge}(\text{MIN}\{P_{EMAX,c}, P_{EMAX,EN-DC}\}/10) - \hat{P}_{MCG})), P_{NR}, P_{PowerClass} - \Delta P_{PowerClass}\}$$

else $$P_{CMAX\_H,f,c,NR} = \text{infinite}$$

where $\hat{P}_{MCG}$ is the configured output power for the MCG in linear terms

- $P_{LTE}$ and $P_{NR}$ are the linear values for the $P_{LTE}$ and $P_{NR}$ respectively signaled by RRC defined in 3GPP TS 38.331
- $\Delta T_{C\_E\text{-}UTRA,c} = 1.5$ dB when NOTE 2 in Table 6.2.2-1 in TS 36.101 applies for a serving cell c, otherwise $\Delta T_{C\_E\text{-}UTRA,c} = 0$ dB;
- $\Delta T_{C\_NR,c} = 1.5$ dB when NOTE 3 in Table 6.2.1-1 in TS 38.101-1 applies for a serving cell c, otherwise $\Delta T_{C\_NR,c} = 0$ dB;
- $\Delta T_{IB,c}$ specified in sub-clause 6.2.7 for EN-DC, the individual Power Class defined in table 6.2B.1-3 and any other additional power reductions parameters specified in sub-clauses 6.2.3 and 6.2.4 for EN-DC are applicable to $P_{CMAX\_E\text{-}UTRA,c}$ and $P_{CMAX\_NR,c}$ evaluations.

and whenever NS_01 is not indicated within CG 2:
- for a UE indicating support of dynamicPowerSharing, A-MPR$_c$=A-MPR'$_c$ with A-MPR'$_c$ determined in accordance with sub-clause 6.2B.3.1 and MPR$_c$=0 dB if transmission(s) in subframe p on CG 1 overlap in time with physical channel q on CG 2;
- for a UE indicating support of dynamicPowerSharing, A-MPR$_c$ is determined in accordance with 3GPP TS 36.101: "Evolved Universal Terrestrial Radio Access (E-UTRA); User Equipment (UE) radio transmission and reception" if transmission(s) in subframe p on CG 1 does not overlap in time with physical channel q on CG 2;
- for a UE not indicating support of dynamicPowerSharing, the A-MPR$_c$ is determined in accordance with sub-clause 6.2B.3.1 with parameters applicable for UEs not indicating support of dynamicPowerSharing and MPR$_c$=0 dB;

and whenever NS_01 is indicated in CG 2.
- for a UE indicating support of dynamicPowerSharing, MPRc=MPR'c with MPR'c determined in accordance with sub-clause 6.2B.2.1 and A-MPRc=0 dB if transmission(s) in subframe p on CG 1 overlap in time with physical channel q on CG 2;
- for a UE indicating support of dynamicPowerSharing, MPRc is determined in accordance with 3GPP TS 36.101: "Evolved Universal Terrestrial Radio Access (E-UTRA); User Equipment (UE) radio transmission and reception" if transmission(s) in subframe p on CG 1 does not overlap in time with physical channel q on CG 2;
- for a UE not indicating support of dynamicPowerSharing, the MPRc is determined in accordance with sub-clause 6.2B.2.1 with parameters applicable for UEs not indicating support of dynamicPowerSharing and MPRc=0 dB;

If the transmissions from NR and E-UTRA do not overlap, then the complete sub-clauses for configured transmitted power for E-UTRA and NR respectively from their own specifications apply with the modifications specified above. The lower value between $P_{PowerClass, EN\text{-}DC}$ or $P_{EMAX, EN\text{-}DC}$ shall not be exceeded at any time by UE.

If the EN-DC UE is not supporting dynamic power sharing, then the complete sub-clauses for configured transmitted power for E-UTRA and NR respectively from their own specifications TS 36.101 and TS 38.101-1 respectively apply with the modifications specified above.

P_EN-DC Total is the dB value of $\hat{P}_{Total}^{EN\text{-}DC}$, which is used in [38.213] and $P_{EMAX, EN\text{-}DC}$ is p-maxUE-FR1-r15 value signaled by RRC and defined in [36.331];

If the UE does not support dynamic power sharing, $$P_{EN\text{-}DC,tot} = \text{MIN}\{P_{EMAX,EN\text{-}DC}, P_{PowerClass,EN\text{-}DC}\} + 0.3 \text{ dB}$$

For UEs indicating support of dynamicPowerSharing in the UE-MRDC-Capability IE the UE can configure the total maximum transmission power within the range $$P_{EN\text{-}DC,tot\_L} \leq P_{EN\text{-}DC,tot} \leq P_{EN\text{-}DC,tot\_H}$$

where $$P_{EN\text{-}DC,tot\_L}(p,q) = \text{MIN}\{P_{PowerClass,EN\text{-}DC}, P_{EMAX,EN\text{-}DC}\}$$

$$P_{EN\text{-}DC,tot\_H}(p,q) = \text{MIN}\{P_{PowerClass,EN\text{-}DC}, P_{EMAX,EN\text{-}DC}\}$$

for sub-frame p on CG 1 overlapping with physical channel q on CG 2 and with MPR$_{tot}$ and A-MPR$_{tot}$ in accordance with 6.2B.2.1 and sub-clause 6.2B.3.1, respectively.

The measured total maximum output power $P_{UMAX}$ over both CGs/RATs, measured over the transmission reference time duration is $$P_{UMAX} = 10 \log_{10}[p_{UMAX,c,E\text{-}UTRA} + p_{UMAX,f,c,NR}],$$

where $p_{UMAX,c,E\text{-}UTRA}$ and $p_{UMAX,c,NR}$ denotes the measured output power of serving cell c for E-UTRA and NR respectively, expressed in linear scale.

For UEs indicating support of dynamicPowerSharing, the measured total configured maximum output power $P_{UMAX}$ shall be within the following bounds:

$$P_{CMAX\_L} - T_{LOW}(P_{CMAX\_L}) \leq P_{UMAX} \leq P_{CMAX\_H} + T_{HIGH}(P_{CMAX\_H})$$

with the tolerances $T_{LOW}(p_{CMAX\_L})$ and $T_{HIGH}(p_{CMAX\_H})$ for applicable values of $P_{CMAX\_L}$ and $P_{CMAX\_L}$ specified in Table 6.2B.4.1.1-2.

When an UL subframe transmission p from E-UTRA overlap with a physical channel q from the NR, then for $P_{UMAX}$ evaluation, the E-UTRA subframe p is taken as reference period $T_{REF}$ and always considered as the reference measurement duration and the following rules are applicable.

$T_{REF}$ and $T_{eval}$ are specified in Table 6.2B.4.1.1-1 when same or different subframes and physical channel durations are used in aggregated carriers. $P_{PowerClass,EN\text{-}DC}$ shall not be exceeded by the UE during any evaluation period of time.

TABLE 6.2B.4.1.1-1

| | $P_{CMAX}$ evaluation window | |
|---|---|---|
| transmission duration | $T_{REF}$ | $T_{eval}$ |
| Different transmission duration in different RAT carriers | LTE Subframe | Min($T_{no\_hopping}$, Physical Channel Length) |

For each $T_{REF}$, the $P_{CMAX\_H}$ is evaluated per $T_{eval}$ and given by the maximum value over the transmission(s) within the $T_{eval}$ as follows:

$$P_{CMAX\_H} = \text{MAX}\{P_{CMAX\_EN\text{-}DC\_H}(p,q), P_{CMAX\_EN\text{-}DC\_H}(p,q+1), \ldots, P_{CMAX\_EN\text{-}DC\_H}(p,q+n)\}$$

where $P_{CMAX\_EN\text{-}DC\_H}$ are the applicable upper limits for each overlapping scheduling unit pairs (p,q), (p, q+1), up to (p, q+n) for each applicable $T_{eval}$ duration, where q+n is the last NR UL physical channel overlapping with LTE subframe p.

While $P_{CMAX\_L}$ is computed as follows:

$$P_{CMAX\_L} = \text{MIN}\{P_{CMAX\_EN\text{-}DC\_L}(p,q), P_{CMAX\_EN\text{-}DC\_L}(p,q+1), \ldots, P_{CMAX\_EN\text{-}DC\_L}(p,q+n)\}$$

where $P_{CMAX\_EN\text{-}DC\_L}$ are the applicable lower limits for each overlapping scheduling unit pairs (p,q), (p, q+1), up to (p, q+n) for each applicable $T_{eval}$ duration, where q+n is the last NR UL physical channel overlapping with LTE subframe p,
With $$P_{CMAX\_EN\text{-}DC\_H}(p,q) = \text{MIN}\{10 \log_{10}[p_{CMAX\_H\_E\text{-}UTRA,c}(p) + p_{CMAX\_H,f,c,NRc}(q)], P_{EMAX,EN\text{-}DC}, P_{PowerClass,EN\text{-}DC}\}$$

And:

$$a = 10 \log_{10}[p_{CMAX\_E\text{-}UTRA,c}(p) + p_{CMAX,f,c,NR}(q)] > P_{EN\text{-}DC,tot\_L}$$

$$b = 10 \log_{10}[p_{CMAX\_E\text{-}UTRA,c}(p) + p_{CMAX,f,c,NR}(q) / X\_\text{scale}] > P_{EN\text{-}DC,tot\_L}$$

If a=FALSE and the configured transmission power spectral density between the MCG and SCG differs by less than [6] dB $$P_{CMAX\_EN\text{-}DC\_L}(p,q) = \text{MIN}\{10 \log_{10}[p_{CMAX\_L\_E\text{-}UTRA,c}(p) + p_{CMAX\_L,f,c,NRc}(q)], P_{EMAX,EN\text{-}DC}, P_{PowerClass,EN\text{-}DC}\}$$

ELSE If (a=TRUE) AND (b=FALSE) and the configured transmission power spectral density between the MCG and SCG differs by less than [6] dB $$P_{CMAX\_EN\text{-}DC\_L}(p,q) = \text{MIN}\{10 \log_{10}[p_{CMAX\_L\_E\text{-}UTRA,c}(p) + p_{CMAX\_L,f,c,NRc}(q) / X\_\text{scale}], P_{EMAX,EN\text{-}DC}, P_{PowerClass,EN\text{-}DC}\}$$

ELSE If b=TRUE or the configured transmission power spectral density between the MCG and SCG differs by more than [6] dB $$P_{CMAX\_EN\text{-}DC\_L}(p,q) = \text{MIN}\{10 \log_{10}[p_{CMAX\_L\_E\text{-}UTRA,c}(p)], P_{EMAX,EN\text{-}DC}, P_{PowerClass,EN\text{-}DC}\}$$

where $p_{CMAX\_H\_E\text{-}UTRA,c}(p)$ is the E-UTRA higher limit of the maximum configured power expressed in linear scale;

$p_{CMAX\_H\_NR,c}(q)$ is the NR higher limit of the maximum configured power expressed in linear scale;

$p_{CMAX\_L\_E\text{-}UTRA,c}(p)$ is the E-UTRA lower limit of the maximum configured power expressed in linear scale;

$p_{CMAX\_L\_NR,c}(q)$ is the NR lower limit of the maximum configured power expressed in linear scale;

$P_{PowerClass,EN\text{-}DC}$ is defined in sub-clause 6.2B.1.1-1 for intra-band EN-DC;

X_scale is the linear value of X dB which is configured by RRC and can only take values [0, 6] dB $p_{CMAX\_E\text{-}UTRA,c}(p)$ is the linear value of $P_{CMAX\_E\text{-}UTRA,c}(p)$, the real configured max power for LTE $p_{CMAX,f,c\_NR}(q)$ is the linear value of $P_{CMAX,f,c\_NR}(q)$, the real configured max power of NR

TABLE 6.2B.4.1.1-2

$P_{CMAX}$ tolerance for Dual Connectivity LTE-NR

| | Tolerance | | Tolerance | |
|---|---|---|---|---|
| $P_{CMAX}$(dBm) | $T_{LOW}$ (dB) | ($P_{CMAX\_L}$) | $T_{HIGH}$ (dB) | ($P_{CMAX\_H}$) |
| 23 ≤ $P_{CMAX}$ ≤ 33 | [3.0] | | [2.0] | |
| 22 ≤ $P_{CMAX}$ < 23 | [5.0] | | [2.0] | |
| 21 ≤ $P_{CMAX}$ < 22 | [5.0] | | [3.0] | |
| 20 ≤ $P_{CMAX}$ < 21 | [6.0] | | [4.0] | |
| 16 ≤ $P_{CMAX}$ < 20 | [5.0] | | | |
| 11 ≤ $P_{CMAX}$ < 16 | [6.0] | | | |
| −40 ≤ $P_{CMAX}$ < 11 | [7.0] | | | |

If the UE supports dynamic power sharing, and when LTE and NR transmissions overlap and the condition (If (a=TRUE) AND (b=FALSE)) is met, SCG shall be transmitted and the following supplementary minimum requirement apply for the measured SCG power, $P_{UMAX,f,c,NR}(q)$, under nominal conditions and unless otherwise stated $$10 \log(p_{CMAX\_L,f,c,NR}(q)/X\_\text{scale}) \leq T_{LOW}(10 \log(p_{CMAXL,f,c,NR}(q)/X\_\text{scale})) \leq P_{UMAX,f,c,NR}(q) \leq 10 \log(p_{CMAX\_H,f,c,NR}(q)) + T_{HIGH}(10 \log(p_{CMAX\_H,f,c,NR}(q)))$$

with the tolerances $T_{LOW}$ and $T_{HIGH}$ for applicable values of PCMAX specified in Table 6.2B.4.1.1-2.

If the UE supports dynamic power sharing, the measured maximum output power in subframe p on CG 1, $p_{UMAX,c,E\text{-}UTRA}$, shall meet the requirements in subclause 6.2.5 in 3GPP TS 36.101: "Evolved Universal Terrestrial Radio Access (E-UTRA); User Equipment (UE) radio transmission and reception" with the limits $P_{CMAX\_L,c}$ and $P_{CMAX\_H,c}$ replaced by $P_{CMAX\_L\_E\text{-}UTRA,c}$ and $P_{CMAX\_H\_E\text{-}UTRA,c}$ as specified above, respectively.

If the configured transmission power spectral density between the MCG and SCG differs by more than [6] dB, then $$P_{UMAX,f,c,NR}(q) \leq 10 \log(p_{CMAX\_H,f,c,NR}(q)) + T_{HIGH}(10 \log(p_{CMAX\_H,f,c,NR}(q)))$$

6.2B.4.1.2 Intra-Band Non-Contiguous EN-DC

Figure 3:
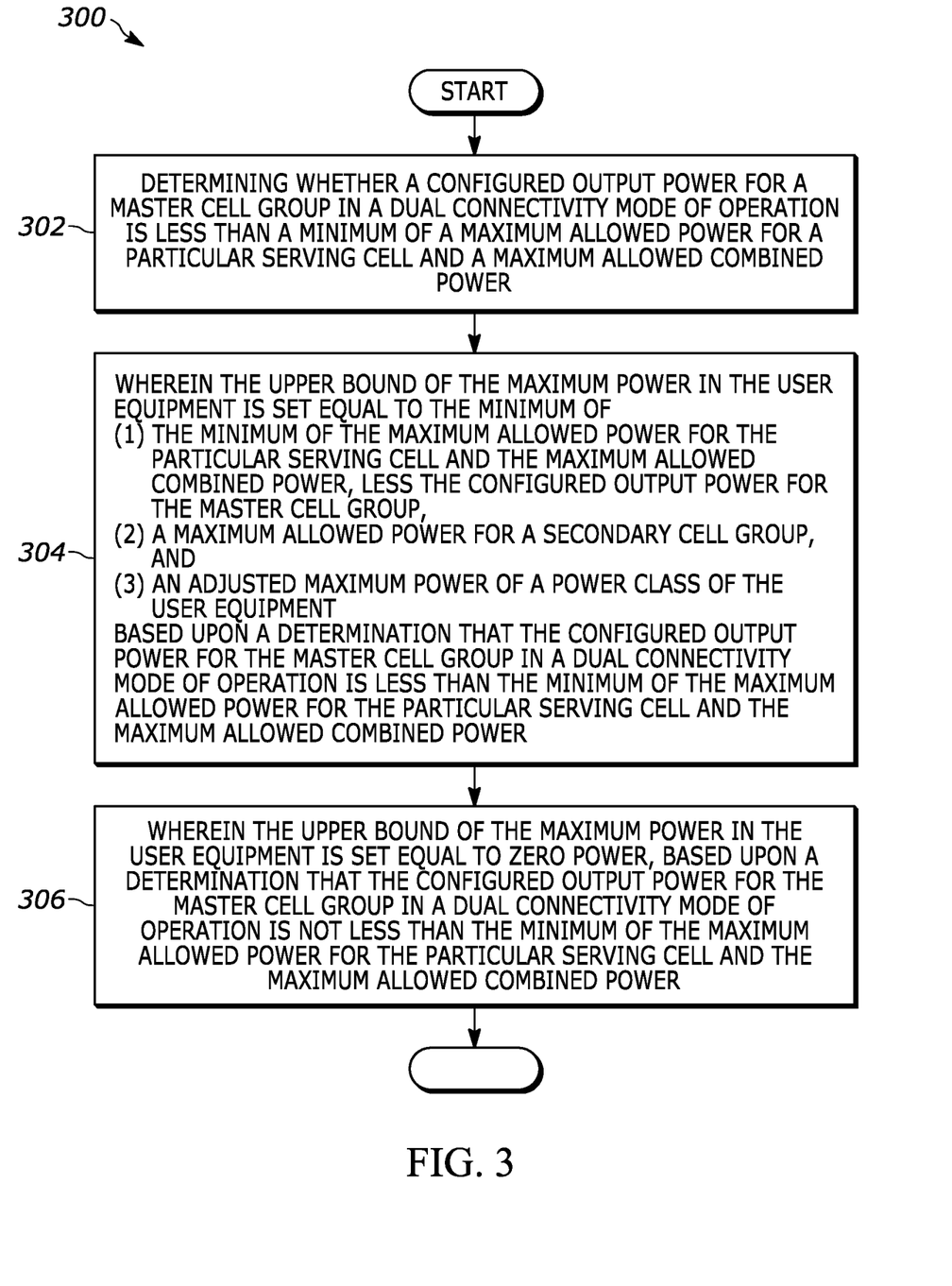
FIG. 3 is a flow diagram in a user equipment for managing the maximum power on a secondary carrier.

FIG. 3 illustrates a flow diagram 300 in a user equipment for managing the maximum power on a secondary carrier including determining an upper bound of a maximum power in the user equipment, which can configure the maximum power in a range that is defined by the upper bound and a lower bound. The method includes determining 302 whether a configured output power for a master cell group in a dual connectivity mode of operation is less than a minimum of a maximum allowed power for a particular serving cell and a maximum allowed combined power. The upper bound of the maximum power in the user equipment is set 304 equal to the minimum of (1) the minimum of the maximum allowed power for the particular serving cell and the maximum allowed combined power, less the configured output power for the master cell group, (2) a maximum allowed power for a secondary cell group, and (3) an adjusted maximum power of a power class of the user equipment, based upon a determination that the configured output power for the master cell group in a dual connectivity mode of operation is less than the minimum of the maximum allowed power for the particular serving cell and the maximum allowed combined power. The upper bound of the maximum power in the user equipment is set 306 equal to zero power, based upon a determination that the configured output power for the master cell group in a dual connectivity mode of operation is not less than the minimum of the maximum allowed power for the particular serving cell and the maximum allowed combined power.

In some instances, determining whether a configured output power for a master cell group in a dual connectivity mode of operation is less than a minimum of a maximum allowed power for a particular serving cell and a maximum allowed combined power can include a determination that $10*\log_{10}(\hat{P}_{MCG}) < 10\textasciicircum(MIN\{P_{EMAX,c}, P_{EMAX,EN-DC}\}/10)$, where $\hat{P}_{MCG}$ is the configured output power for the master cell group in linear terms.

In some instances, setting the upper bound of the maximum power in the user equipment based upon a determination that the configured output power for the master cell group in a dual connectivity mode of operation is less than the minimum of the maximum allowed power for the particular serving cell and the maximum allowed combined power can include $P_{CMAX\_H,f,c,NR} = MIN\{10*\log_{10}(10\textasciicircum(MIN\{P_{EMAX,c}, P_{EMAX,EN-DC}\}/10) - \hat{P}_{MCG}), P_{NR}, P_{PowerClass} - \Delta P_{PowerClass}\}$, where $\hat{P}_{MCG}$ is the configured output power for the master cell group in linear terms.

In some instances, the dual connectivity mode of operation can include intra-band dual connectivity mode.

In some instances, the dual connectivity mode of operation can include inter-band dual connectivity mode.

In some instances, the master cell group and the secondary cell group associated with the dual connectivity mode can include an operation in accordance with multiple cellular standards. In some of these instances, the multiple cellular standards can include long term evolution (LTE) and new radio (NR).

In some instances, the user equipment can be required to transmit the secondary cell group, in response to a determination that $10 \log_{10}[p_{CMAX\_E-UTRA,c}(p) + P_{CMAX,f,c,NR}(q)] \leq P_{EN-DC,tot\_L}$.

In some instances, the user equipment can be required to transmit the secondary cell group, in response to a determination that $10 \log_{10}[p_{CMAX\_E-UTRA,c}(p) + P_{CMAX,f,c,NR}(q)] > P_{EN-DC,tot\_L}$, and $10 \log_{10}[P_{CMAX\_E-UTRA,c}(p) + P_{CMAX,f,c,NR}(q)/X\_scale] \leq P_{EN-DC,tot\_L}$.

In some instances, the user equipment may not be required to transmit the secondary cell group, in response to a determination that $10 \log_{10}[p_{CMAX\_E-UTRA,c}(p) + P_{CMAX,f,c,NR}(q)/X\_scale] > P_{EN-DC,tot\_L}$.

In some instances, the method can further include defining a maximum power reduction/additional maximum power reduction for a secondary cell group in addition to the master cell group for intra-band dual connectivity operation. The maximum power reduction/additional maximum power reduction for the secondary cell group can be defined as a difference between $P_{PowerClass,EN-DC}$ and a remaining power, where the remaining power is a difference between $P_{PowerClass,EN-DC}$ reduced by a total maximum power reduction/additional maximum power reduction and $\hat{P}_{MCG}$, which corresponds to an actual transmission power on the master cell group.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 4:
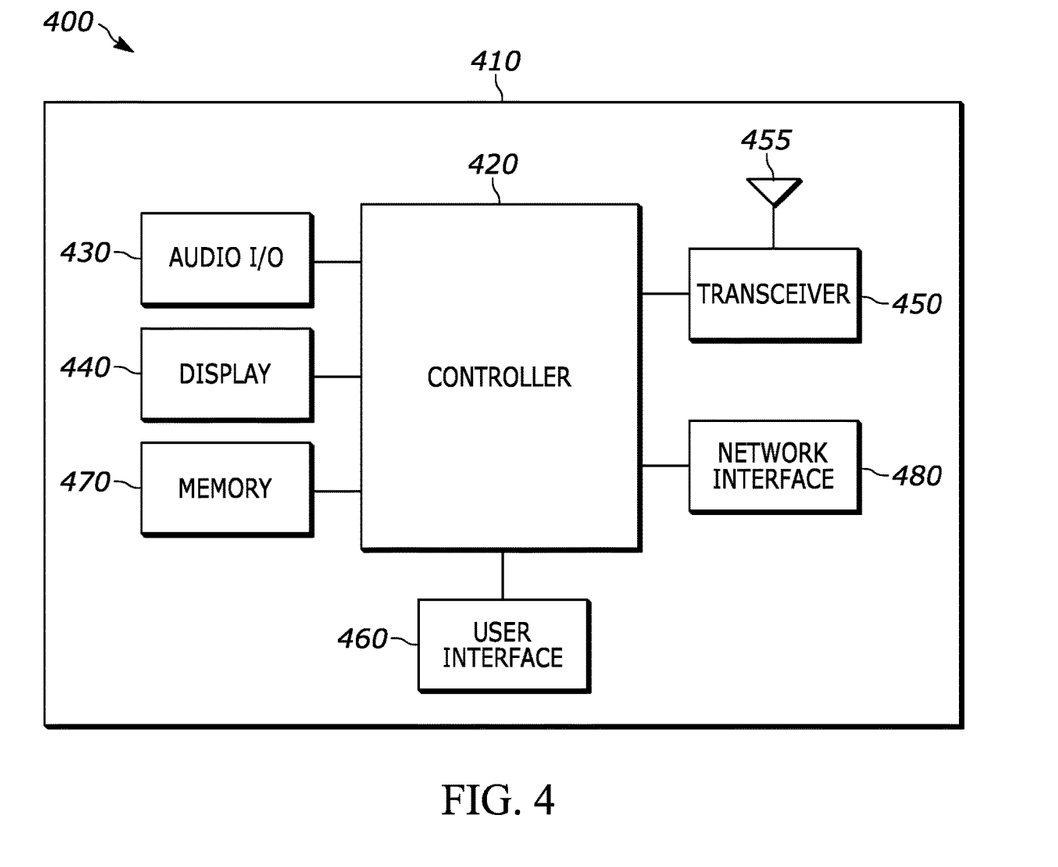
FIG. 4 is an exemplary block diagram of an apparatus according to a possible embodiment.

FIG. 4 is an example block diagram of an apparatus 400, such as the wireless communication device 110, according to a possible embodiment. The apparatus 400 can include a housing 410, a controller 420 within the housing 410, audio input and output circuitry 430 coupled to the controller 420, a display 440 coupled to the controller 420, a transceiver 450 coupled to the controller 420, an antenna 455 coupled to the transceiver 450, a user interface 460 coupled to the controller 420, a memory 470 coupled to the controller 420, and a network interface 480 coupled to the controller 420. The apparatus 400 can perform the methods described in all the embodiments The display 440 can be a viewfinder, a liquid crystal display (LCD), a light emitting diode (LED) display, a plasma display, a projection display, a touch screen, or any other device that displays information. The transceiver 450 can include a transmitter and/or a receiver. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The network interface 480 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 470 can include a random access memory, a read only memory, an optical memory, a solid state memory, a flash memory, a removable memory, a hard drive, a cache, or any other memory that can be coupled to an apparatus.

The apparatus 400 or the controller 420 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 470 or elsewhere on the apparatus 400. The apparatus 400 or the controller 420 may also use hardware to implement disclosed operations. For example, the controller 420 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating an apparatus and implementing the disclosed embodiments. Some or all of the additional elements of the apparatus 400 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment for determining an upper bound of a maximum power in the user equipment, which can configure the maximum power in a range that is defined by the upper bound and a lower bound, the method comprising:
    determining whether a configured output power for a master cell group in a dual connectivity mode of operation is less than a minimum of a maximum allowed power for a particular serving cell and a maximum allowed combined power;
    wherein the upper bound of the maximum power in the user equipment is set equal to a minimum of
    (1) the minimum of the maximum allowed power for the particular serving cell and the maximum allowed combined power, less the configured output power for the master cell group,
    (2) a maximum allowed power for a secondary cell group, and
    (3) an adjusted maximum power of a power class of the user equipment,
    based upon a determination that the configured output power for the master cell group in the dual connectivity mode of operation is less than the minimum of the maximum allowed power for the particular serving cell and the maximum allowed combined power; and
    wherein the upper bound of the maximum power in the user equipment is set equal to zero power, based upon a determination that the configured output power for the master cell group in the dual connectivity mode of operation is not less than the minimum of the maximum allowed power for the particular serving cell and the maximum allowed combined power; and
    communicating with a communication network via the master cell group and the secondary cell group in accordance with the determined upper bound of the maximum power in the user equipment.

2. The method in accordance with claim 1, wherein determining whether the configured output power for the master cell group in the dual connectivity mode of operation is less than the minimum of the maximum allowed power for the particular serving cell and the maximum allowed combined power includes a determination that $$10*\log_{10}(\hat{P}_{MCG}) < 10^{\wedge}(\text{MIN}\{P_{EMAX,c}, P_{EMAX,EN-DC}\}/10),$$

where $\hat{P}_{MCG}$ is the configured output power for the master cell group in linear terms.

3. The method in accordance with claim 1, wherein setting the upper bound of the maximum power in the user equipment based upon the determination that the configured output power for the master cell group in the dual connectivity mode of operation is less than the minimum of the maximum allowed power for the particular serving cell and the maximum allowed combined power includes $$P_{CMAX\_H,f,c,NR} = \text{MIN}\{10*\log_{10}(10^{\wedge}(\text{MIN}\{P_{EMAX,c}, P_{EMAX,EN-DC}\}/10) - \hat{P}_{MCG}), P_{NR}, P_{PowerClass} - \Delta P_{PowerClass}\},$$

where $\hat{P}_{MCG}$ is the configured output power for the master cell group in linear terms.

4. The method in accordance with claim 1, wherein the dual connectivity mode of operation includes intra-band dual connectivity mode.

5. The method in accordance with claim 1, wherein the dual connectivity mode of operation includes inter-band dual connectivity mode.

6. The method in accordance with claim 1, wherein the master cell group and the secondary cell group associated with the dual connectivity mode includes an operation in accordance with multiple cellular standards.

7. The method in accordance with claim 6, wherein the multiple cellular standards include long term evolution (LTE) and new radio (NR).

8. The method in accordance with claim 1, wherein the user equipment is required to transmit the secondary cell group, in response to a determination that $$10\log_{10}[P_{CMAX\_E-UTRA,c}(p) + p_{CMAX,f,c,NR}(q)] \leq P_{EN-DC,tot\_L}.$$

9. The method in accordance with claim 1, wherein the user equipment is required to transmit the secondary cell group, in response to a determination that $$10 \log_{10}[p_{CMAX\_E\text{-}UTRA,c}(p)+p_{CMAX,f,c,NR}(q)] > P_{EN\text{-}DC,tot\_L}, \text{ and}$$

$$10 \log_{10}[p_{CMAX\_E\text{-}UTRA,c}(p)+p_{CMAX,f,c,NR}(q)/X\_\text{scale}] \leq P_{EN\text{-}DC,tot\_L}.$$

10. The method in accordance with claim 1, wherein the user equipment is not required to transmit the secondary cell group, in response to a determination that $$10 \log_{10}[P_{CMAX\_E\text{-}UTRA,c}(p)+p_{CMAX,f,c,NR}(q)/X\_\text{scale}] > P_{EN\text{-}DC,tot\_L}.$$

11. The method in accordance with claim 1, further comprising
   defining a maximum power reduction/additional maximum power reduction for the secondary cell group in addition to the master cell group for intra-band dual connectivity operation;
   wherein the maximum power reduction/additional maximum power reduction for the secondary cell group is defined as a difference between $P_{PowerClass,EN\text{-}DC}$ and a remaining power, where the remaining power is a difference between $P_{PowerClass,EN\text{-}DC}$ reduced by a total maximum power reduction/additional maximum power reduction and $\hat{P}_{MCG}$, which corresponds to an actual transmission power on the master cell group.

12. A user equipment in a communication network, the user equipment comprising:
   a transceiver; and
   a controller that determines an upper bound of a maximum power in the user equipment, which can configure the maximum power in a range that is defined by the upper bound and a lower bound, comprising:
   wherein the controller further determines whether a configured output power for a master cell group in a dual connectivity mode of operation is less than a minimum of a maximum allowed power for a particular serving cell and a maximum allowed combined power;
   wherein the upper bound of the maximum power in the user equipment is set equal to a minimum of
      (1) the minimum of the maximum allowed power for the particular serving cell and the maximum allowed combined power, less the configured output power for the master cell group,
      (2) a maximum allowed power for a secondary cell group, and
      (3) an adjusted maximum power of a power class of the user equipment,
   based upon a determination by the controller that the configured output power for the master cell group in the dual connectivity mode of operation is less than the minimum of the maximum allowed power for the particular serving cell and the maximum allowed combined power; and
   wherein the upper bound of the maximum power in the user equipment is set equal to zero power, based upon a determination by the controller that the configured output power for the master cell group in the dual connectivity mode of operation is not less than the minimum of the maximum allowed power for the particular serving cell and the maximum allowed combined power; and
   wherein the transceiver communicates with the communication network via the master cell group and the secondary cell group in accordance with the determined upper bound of the maximum power in the user equipment.

13. The user equipment in accordance with claim 12, wherein determining whether the configured output power for the master cell group in the dual connectivity mode of operation is less than the minimum of the maximum allowed power for the particular serving cell and the maximum allowed combined power includes a determination that $$10*\log_{10}(\hat{P}_{MCG}) < 10^{\wedge}(\text{MIN}\{P_{EMAX,c}, P_{EMAX,EN\text{-}DC}\}/10),$$

where $\hat{P}_{MCG}$ is the configured output power for the master cell group in linear terms.

14. The user equipment in accordance with claim 12, wherein setting the upper bound of the maximum power in the user equipment based upon the determination that the configured output power for the master cell group in the dual connectivity mode of operation is less than the minimum of the maximum allowed power for the particular serving cell and the maximum allowed combined power includes $$P_{CMAX\_H,f,c,NR} = \text{MIN}\{10*\log_{10}(10^{\wedge}(\text{MIN}\{P_{EMAX,c}, P_{EMAX,EN\text{-}DC}\}/10) - \hat{P}_{MCG}), P_{NR}, P_{PowerClass} - \Delta P_{PowerClass}\},$$

where $\hat{P}_{MCG}$ is the configured output power for the master cell group in linear terms.

15. The user equipment in accordance with claim 12, wherein the dual connectivity mode of operation includes intra-band dual connectivity mode.

16. The user equipment in accordance with claim 12, wherein the dual connectivity mode of operation includes inter-band dual connectivity mode.

17. The user equipment in accordance with claim 12, wherein the master cell group and the secondary cell group associated with the dual connectivity mode includes an operation in accordance with multiple cellular standards.

18. The user equipment in accordance with claim 17, wherein the multiple cellular standards include long term evolution (LTE) and new radio (NR).

19. The user equipment in accordance with claim 12, further comprising
   wherein the controller further defines a maximum power reduction/additional maximum power reduction for the secondary cell group in addition to the master cell group for intra-band dual connectivity operation;
   wherein the maximum power reduction/additional maximum power reduction for the secondary cell group is defined as a difference between $P_{PowerClass,EN\text{-}DC}$ and a remaining power, where the remaining power is a difference between $P_{PowerClass,EN\text{-}DC}$ reduced by a total maximum power reduction/additional maximum power reduction and $\hat{P}_{MCG}$, which corresponds to an actual transmission power on the master cell group.

* * * * *